(12) United States Patent
Lee et al.

(10) Patent No.: US 8,543,155 B2
(45) Date of Patent: Sep. 24, 2013

(54) CHANNEL ACCESS METHOD FOR VEHICLE COMMUNICATION HANDOVER

(75) Inventors: Sangwoo Lee, Daejeon (KR); Hyun Kyun Choi, Daejeon (KR); Hyun Seo Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 233 days.

(21) Appl. No.: 13/195,365

(22) Filed: Aug. 1, 2011

(65) Prior Publication Data

US 2012/0028675 A1    Feb. 2, 2012

(30) Foreign Application Priority Data

Aug. 2, 2010    (KR) .................. 10-2010-0074672

(51) Int. Cl.
*H04B 7/00*    (2006.01)
(52) U.S. Cl.
USPC ........ 455/525; 455/575.9; 455/436; 455/443; 340/426.16
(58) Field of Classification Search
USPC .............. 455/525, 436, 439, 442, 443, 575.9, 455/99, 152.1, 557; 340/991, 426.16
See application file for complete search history.

(56) References Cited

U.S. PATENT DOCUMENTS

| 5,666,109 | A | * | 9/1997 | Fukui et al. | .................. | 340/905 |
| 5,819,184 | A | * | 10/1998 | Cashman | .................. | 455/553.1 |
| 2009/0121898 | A1 | * | 5/2009 | Jia et al. | ........................ | 340/928 |
| 2010/0010742 | A1 | * | 1/2010 | Mochizuki | ..................... | 701/301 |
| 2010/0022213 | A1 | * | 1/2010 | Kopikare et al. | ......... | 455/232.1 |

OTHER PUBLICATIONS

"Draft Standard for Wireless Access in Vehicular Environments (WAVE)—Multi-channel Operation", IEEE P1609.4/D9, Aug. 2010, 81pp.
"Wireless LAN Medium Access Control (MAC) and Physical Layer (PHY) Specifications, Amendment 6: Wireless Access in Vehicular Environments", IEEE 802.11, Part II, Jul. 15, 2010, 51pp.

* cited by examiner

*Primary Examiner* — Dominic E Rego
(74) *Attorney, Agent, or Firm* — Staas & Halsey LLP

(57) ABSTRACT

A first roadside equipment operates as a transmitting/receiving mode in a control channel interval of an Nth synchronization interval so as to support a handover. In this instance, a second roadside equipment neighboring to the first roadside equipment operates as a receiving mode in the control channel interval of the Nth synchronization interval. The first roadside equipment operates as the receiving mode in a control channel interval of an (N+1)th synchronization interval. In this instance, the second roadside equipment operates as the transmitting/receiving mode in the control channel interval of the (N+1)th synchronization interval.

12 Claims, 5 Drawing Sheets

CHANNEL ACCESS METHOD FOR VEHICLE COMMUNICATION HANDOVER

CROSS-REFERENCE TO RELATED APPLICATION

This application claims priority to and the benefit of Korean Patent Application No. 10-2010-0074672 filed in the Korean Intellectual Property Office on Aug. 2, 2010, the entire contents of which are incorporated herein by reference.

BACKGROUND OF THE INVENTION (a) Field of the Invention

The present invention relates to a channel access method for supporting vehicle communication handover.

(b) Description of the Related Art

Wireless access in vehicular environments (WAVE) is technology that supplements a conventional wireless local area network (WLAN) (IEEE 802.11) method in order to support communication of a vehicle moving at a high speed. Intelligent transport systems using such WAVE communication include roadside equipment (hereinafter referred to as "RSE") that is positioned at the roadside and on-board equipment (hereinafter referred to as "OBE") that is mounted in a vehicle and perform vehicle-to-infrastructure (V2I) communications between the OBE and the RSE and vehicle-to-vehicle (V2V) communications between the OBEs.

To continuously provide a communication service under the road conditions to which the intelligent transport system is applied, base stations are disposed so that propagation ranges with neighboring base stations may be overlapped. When the propagation ranges of the base stations are overlapped, the base stations use the same frequency as the neighboring base stations to generate interference and communication problems caused by the neighboring base stations.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a channel access method for providing a continuous handover skill between a vehicle and a roadside under a vehicle communication environment.

An exemplary embodiment of the present invention provides a method for a plurality of roadside equipments to access a channel to support a vehicle communication handover, including: a first roadside equipment among the plurality of roadside equipments operating a transmitting/receiving mode in a control channel interval of an Nth synchronization interval; a second roadside equipment neighboring to the first roadside equipment among the plurality of roadside equipments operating as a receiving mode in the control channel interval of the Nth synchronization interval; the first roadside equipment operating as the receiving mode in a control channel interval of an (N+1)th synchronization interval; and the second roadside equipment operating as the transmitting/receiving mode in the control channel interval of the (N+1)th synchronization interval.

Another embodiment of the present invention provides a method for a plurality of roadside equipments to access a channel to support a vehicle communication handover, including: a first roadside equipment among the plurality of roadside equipments operating as a transmitting/receiving mode in a control channel interval of an Nth synchronization interval; a second roadside equipment neighboring to the first roadside equipment among the plurality of roadside equipments operating as a receiving mode in the control channel interval of the Nth synchronization interval; the first roadside equipment and the second roadside equipment operating as the transmitting/receiving mode in a service channel interval of the N-th synchronization interval; the first roadside equipment operating as the receiving mode in a control channel interval of an (N+1)th synchronization interval; the second roadside equipment operating as the transmitting/receiving mode in the control channel interval of the (N+1)th synchronization interval; and the first roadside equipment and the second roadside equipment operating as the transmitting/receiving mode in a service channel interval of the (N+1)th synchronization interval.

DETAILED DESCRIPTION OF THE EMBODIMENTS

Figure 1:
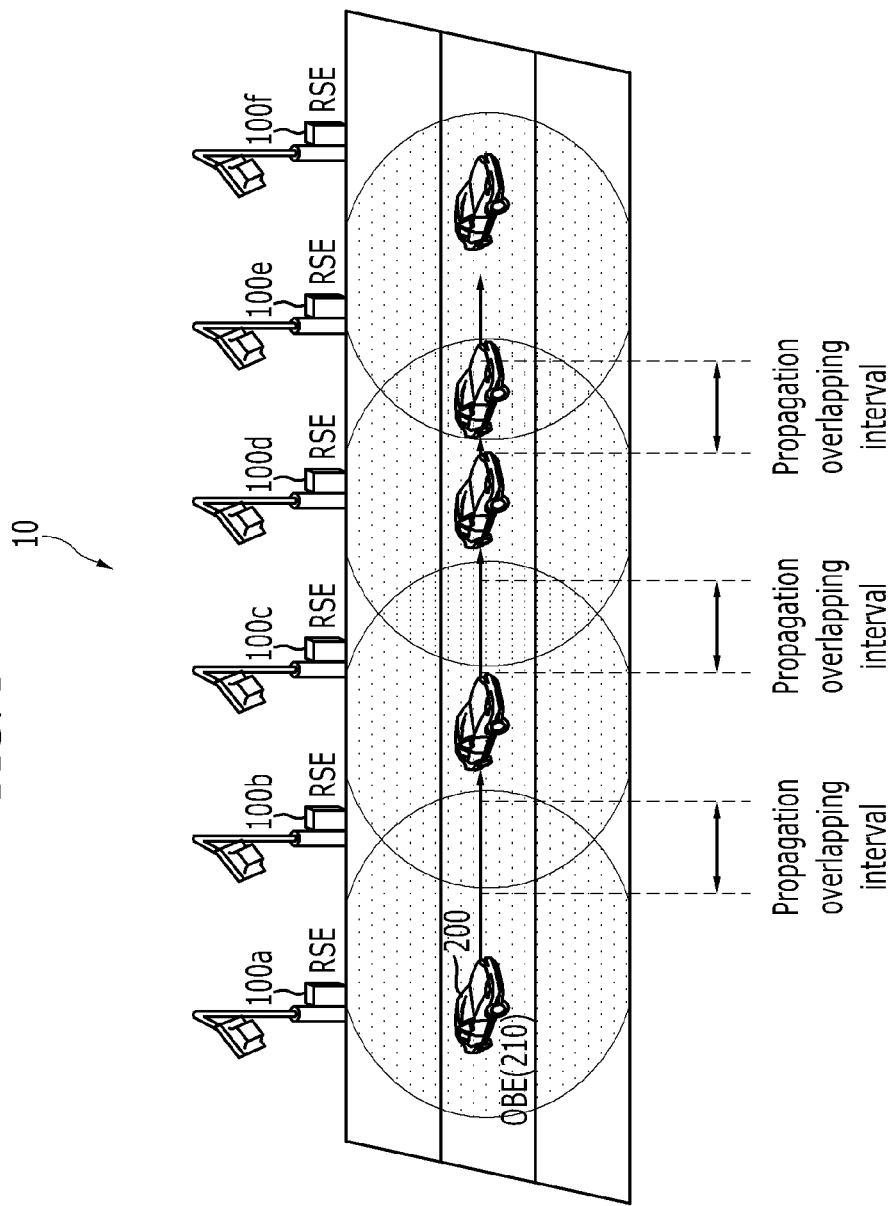
FIG. 1 shows a diagram illustrating an example of a vehicle communication network for supporting vehicle communication handover according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Figure 2:
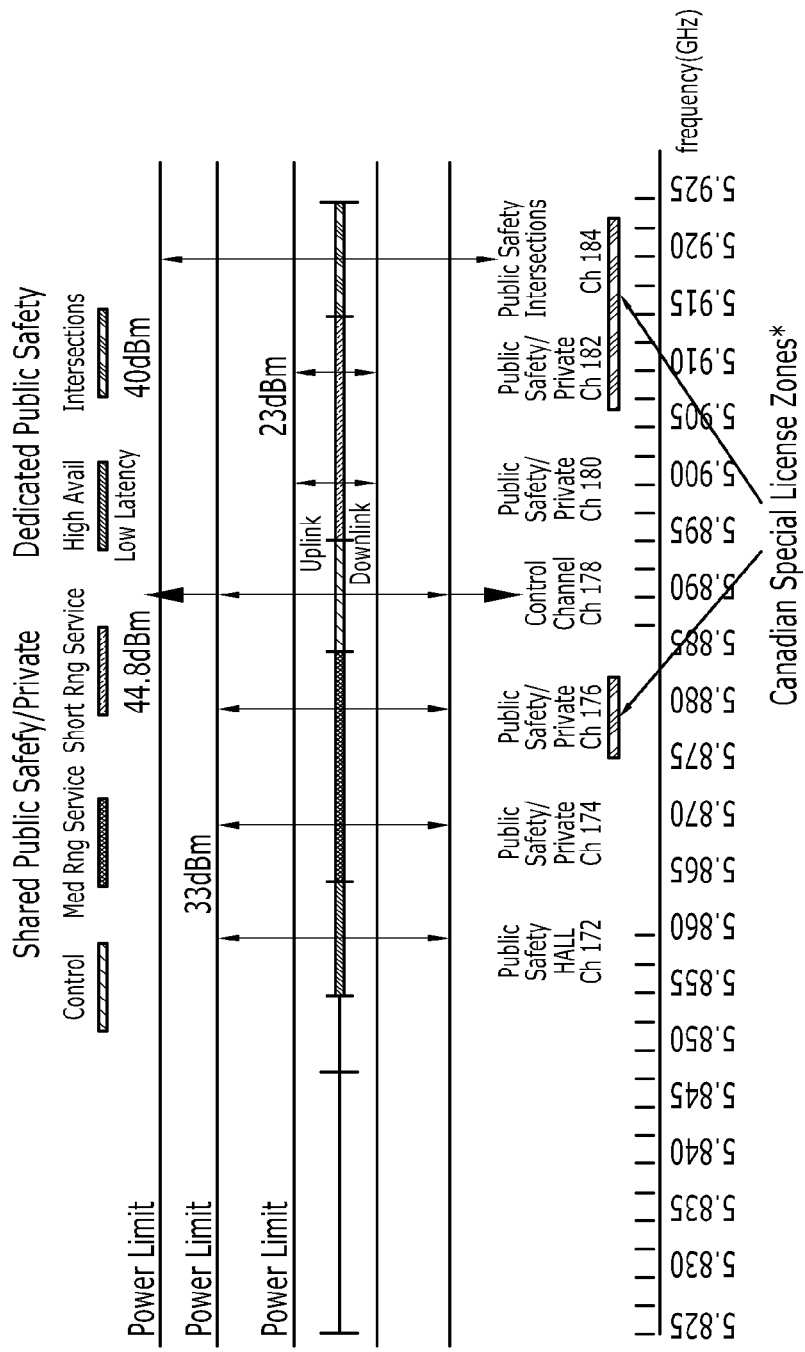
FIG. 2 shows a diagram illustrating an example of a WAVE frequency for supporting vehicle communication in the vehicle communication network of FIG. 1.

FIG. 1 is a diagram illustrating an example of a vehicle communication network for supporting vehicle communication handover according to an exemplary embodiment of the present invention. FIG. 2 is a diagram illustrating an example of a WAVE frequency for supporting vehicle communication in the vehicle communication network of FIG. 1.

As shown in FIG. 1, in a vehicle communication environment for supporting vehicle communication handover according to an exemplary embodiment of the present invention, an intelligent transport system 10 includes roadside equipment (hereinafter referred to as "RSE") 100a-100f and on-board equipment (hereinafter referred to as "OBE") 210 that is mounted in a vehicle 200.

In such a vehicle communication environment, in order to support communication with a vehicle moving at a high speed, communication is performed in a WAVE method, and an example of frequencies in WAVE communication is shown in FIG. 2. Referring to FIG. 2, the WAVE is set to perform communication by allocating a 75 MHz to 5.9 GHz band and using 7 channels of a 10 MHz band. One of 7 channels is a control channel (CCH), and the remaining six channels are service channels (SCH).

Figure 3:
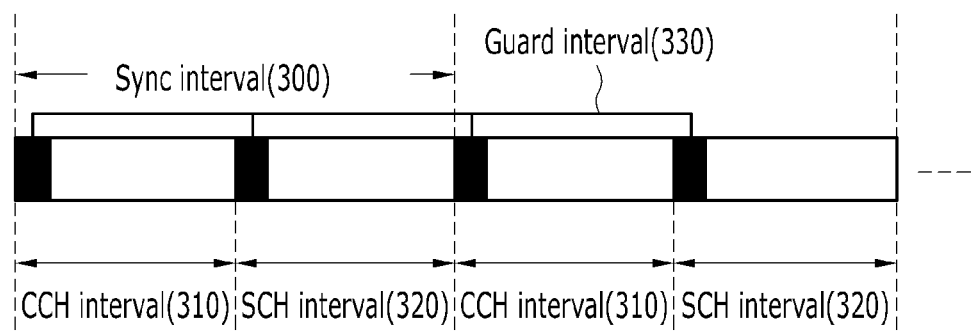
FIG. 3 shows a diagram illustrating an example of a synchronization method for performing communication with an alternating mode in the vehicle communication network of FIG. 1.

When performing WAVE communication, communication may be simultaneously performed in all seven channels, and communication may be performed using one channel at a time. When performing communication using one channel at a time, communication is performed using several channels, and communication is performed in an alternating mode while alternating the CCH and the SCH, as shown in FIG. 3. In order to perform communication, a synchronization interval 300, a CCH interval 310, an SCH interval 320, and a guard interval 330 of the RSE and the OBE should be set.

Here, the guard interval 330 exists whenever alternating from the CCH interval 310 to the SCH interval 320 or from the SCH interval 320 to the CCH interval 310. That is, when the RSEs 100a-100f and the OBE 210 perform communication, the guard interval 330 is formed to compensate each time error. In order to perform continuous communication in an alternating mode in such a structure, it is essential to grasp information of the RSEs 100a-100f, particularly a communication channel and a communication state of the RSEs 100a-100f, and when information of the RSEs 100a-100f is effectively grasped, continuous communication can be performed.

In the above-noted vehicle communication environment, in order to provide continuous communication, the RSEs (100a-100f) are disposed to form an interval in which a propagation range is overlapped with the neighboring RSE (hereinafter, a propagation overlapping interval). In this instance, in the case of an operation with the alternating mode in the propagation overlapping interval, the RSEs (100a-100f) access the CCH interval 310 simultaneously with the neighboring RSE to generate interference caused by the neighboring RSE. That is, the RSEs (100a-100f) use the same frequency as the neighboring RSE to cause communication interference.

To solve the above-noted problem, a channel access method for supporting a vehicle communication handover in a vehicle communication environment according to an exemplary embodiment of the present invention will now be described with reference to FIG. 4 and FIG. 5.

Figure 4:
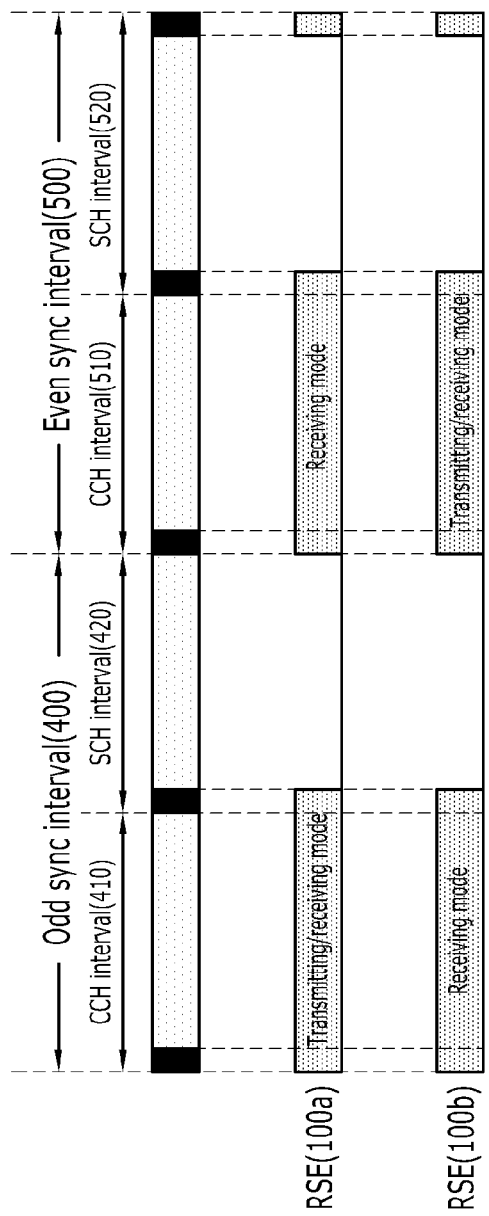
FIG. 4 shows a case for a neighboring RSE to access a channel according to an exemplary embodiment of the present invention.

FIG. 4 shows a case for a neighboring RSE to access a channel according to an exemplary embodiment of the present invention.

Referring to FIG. 1 and FIG. 4, to support a sequential handover, the RSEs (100a-100f) of the intelligent transport system 10 according to an exemplary embodiment of the present invention differentiates the channel access time to access the CCH intervals of different synchronization intervals and perform communication, and thereby prevents the neighboring RSEs from simultaneously accessing the CCH with the same synchronization.

For example, when the RSE 100a neighbors the RSE 100b from among a plurality of RSEs (100a-100f) and the vehicle 200 is positioned in the propagation overlapping interval of the RSE 100a and the RSE 100b, the RSE 100a is operable as a transmitting/receiving mode in the CCH interval 410 of the odd-numbered synchronization interval 400 to attempt a channel access and then transmits/receives a data frame. The RSE 100a is operated as a receiving mode in the CCH interval 510 of the even-numbered synchronization interval 500 to receive a data frame when receiving the data frame from the vehicle 200. In the transmitting/receiving mode, the corresponding RSE accesses the channel and transmits/receives the data frame to/from the vehicle 200 in the propagation overlapping interval, and in the receiving mode, the corresponding RSE does not access the channel and receives the data frame from the vehicle 200 in the propagation overlapping interval.

In this instance, the RSE 100b is operable as the receiving mode in the CCH interval 410 of the odd-numbered synchronization interval 400 to receive a data frame when receiving the data frame from the vehicle 200. The RSE 100b is operable in the transmitting/receiving mode in the CCH interval 510 of the even-numbered synchronization interval 500 to attempt a channel access, and then transmits/receives the data frame. That is, while the RSE 100a is operated as the transmitting/receiving mode in the CCH interval 410 of the odd-numbered synchronization interval 400, the RSE 100b is operable as the receiving mode in the CCH interval 410, and while the RSE 100a is operable as the receiving mode in the CCH interval 510 of the even-numbered synchronization interval 500, the RSE 100b is operable as the transmitting/receiving mode in the CCH interval 510 to prevent the neighboring base station from simultaneously accessing the CCH of the same synchronization interval.

The RSE 100b can access the SCH interval 410 of the odd-numbered synchronization interval 400 and the SCH interval 510 of the even-numbered synchronization interval 500 irrespective of the neighboring RSE.

Figure 5:
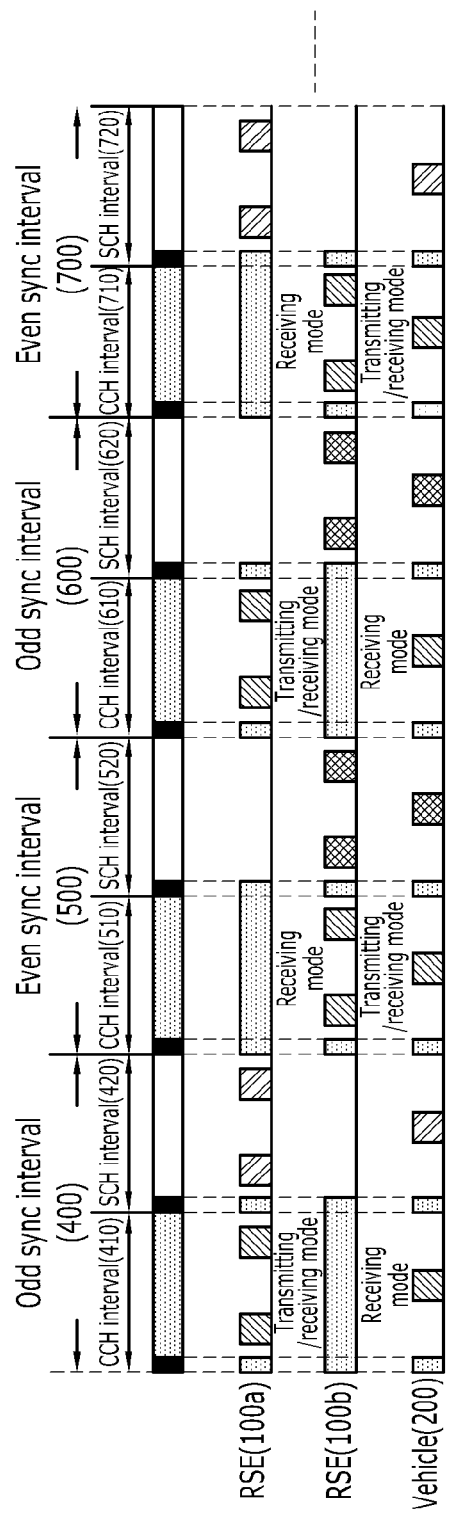
FIG. 5 shows a case of applying a channel access method to an intelligent transport system shown in FIG. 1.

FIG. 5 shows a case of applying a channel access method to an intelligent transport system shown in FIG. 1.

Referring to FIG. 1 and FIG. 5, in the intelligent transport system 10, when the RSE 100a neighbors the RSE 100b from among a plurality of RSEs (100a-100f) and the vehicle 200 is positioned in the propagation overlapping interval of the RSE 100a and the RSE 100b, the RSE 100a is operable as the transmitting/receiving mode in the CCH interval 410 of the odd-numbered synchronization interval 400 and the CCH interval 610 of the synchronization interval 600 to attempt a channel access, and then transmits/receives the data frame. The RSE 100a is operable as the receiving mode in the CCH interval 510 of the even-numbered synchronization interval 500 and the CCH interval 710 of the synchronization interval 700 to receive the data frame.

The RSE 100b is operable as the receiving mode in the CCH interval 410 of the odd-numbered synchronization interval 400 and the CCH interval 610 of the synchronization interval 600 to receive the data frame. The RSE 100b is operable as the transmitting/receiving mode in the CCH interval 510 of the even-numbered synchronization interval 500 and the CCH interval 710 of the synchronization interval 700 to attempt a channel access, and transmits/receives the data frame.

In this instance, the on-board equipment 210 of the vehicle 200 communicates with a single RSE in each synchronization interval. That is, the on-board equipment 210 communicates with the RSE 100a having attempted a channel access in the CCH interval 410 of the odd-numbered synchronization interval 400 and the CCH interval 610 of the synchronization interval 600. The on-board equipment 210 communicates with the RSE 100b having attempted a channel access in the CCH interval 510 of the even-numbered synchronization interval 500 and the CCH interval 710 of the synchronization interval 700. The on-board equipment 210 communicates with the RSE 100a or the RSE 100b in the SCH interval of each synchronization interval to receive a channel service.

In the exemplary embodiment of the present invention, the synchronization interval 400 are the synchronization interval 600 have been shown for the odd-numbered synchronization interval and the synchronization interval 500 and the synchronization interval 700 have been shown for the even-numbered synchronization interval, but the present invention is not restricted thereto, and on-board equipment 210 can communicate with the neighboring RSE by attempting a channel access at different times in the other odd-numbered synchronization intervals and even-numbered synchronization intervals.

Accordingly, when communication is performed by differentiating the time for accessing the channel from the neighboring RSE so as to support the continuous handover skill in the vehicle communication environment according to an exemplary embodiment of the present invention, the communication can be performed without interference with the neighboring RSE, and hence, a seamless service is provided in the fast traveling environment thereby stably supporting the handover skill.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a plurality of roadside equipments to access a channel to support a vehicle communication handover, the method comprising:
    a first roadside equipment among the plurality of roadside equipments operating a transmitting/receiving mode in a control channel interval of an Nth synchronization interval;
    a second roadside equipment neighboring to the first roadside equipment among the plurality of roadside equipments operating as a receiving mode in the control channel interval of the Nth synchronization interval;
    the first roadside equipment operating as the receiving mode in a control channel interval of an (N+1)th synchronization interval; and
    the second roadside equipment operating as the transmitting/receiving mode in the control channel interval of the (N+1)th synchronization interval.

2. The method of claim 1, wherein the Nth synchronization interval and the (N+1)th synchronization interval respectively further include a service channel interval.

3. The method of claim 2, wherein the plurality of roadside equipments operating as the transmitting/receiving mode in the service channel interval of the Nth synchronization interval and the (N+1)th synchronization interval.

4. The method of claim 1, wherein the first roadside equipment or the second roadside equipment transmits/receives a frame to/from a vehicle in the transmitting/receiving mode.

5. The method of claim 1, wherein the first roadside equipment or the second roadside equipment receives a frame from a vehicle in the receiving mode.

6. The method of claim 1, wherein the first roadside equipment and the second roadside equipment are disposed to form an interval in which a propagation range is overlapped.

7. The method of claim 1, wherein the control channel interval and the service channel interval are alternately set in the Nth synchronization interval and the (N+1)th synchronization interval.

8. A method for a plurality of roadside equipments to access a channel to support a vehicle communication handover, the method comprising:
    a first roadside equipment among the plurality of roadside equipments operating as a transmitting/receiving mode in a control channel interval of an Nth synchronization interval;
    a second roadside equipment neighboring to the first roadside equipment among the plurality of roadside equipments operating as a receiving mode in the control channel interval of the Nth synchronization interval;
    the first roadside equipment and the second roadside equipment operating as the transmitting/receiving mode in a service channel interval of the N-th synchronization interval;
    the first roadside equipment operating as the receiving mode in a control channel interval of an (N+1)th synchronization interval;
    the second roadside equipment operating as the transmitting/receiving mode in the control channel interval of the (N+1)th synchronization interval; and
    the first roadside equipment and the second roadside equipment operating as the transmitting/receiving mode in a service channel interval of the (N+1)th synchronization interval.

9. The method of claim 8, wherein the first roadside equipment or the second roadside equipment transmits/receives a frame to/from a vehicle in the transmitting/receiving mode.

10. The method of claim 8, wherein the first roadside equipment or the second roadside equipment receives a frame from a vehicle in the receiving mode.

11. The method of claim 8, wherein the first roadside equipment and the second roadside equipment are disposed to form an interval in which a propagation range is overlapped.

12. The method of claim 8, wherein the control channel interval and the service channel interval are alternately set in the Nth synchronization interval and the (N+1)th synchronization interval.

* * * * *